United States Patent
Chambers et al.

(10) Patent No.: US 10,399,403 B2
(45) Date of Patent: Sep. 3, 2019

(54) SPRING AID ASSEMBLY FOR A VEHICLE SUSPENSION SYSTEM

(71) Applicant: Jaguar Land Rover Limited, Whitley, Coventry, Warwickshire (GB)

(72) Inventors: Diana Chambers, Leamington Spa (GB); James Burt, Leamington Spa (GB); Shaun Blundell, Redditch (GB); Davide Migliorini, Rugby (GB); Rodney Weston, Warwick (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 143 days.

(21) Appl. No.: 15/507,574

(22) PCT Filed: Sep. 1, 2015

(86) PCT No.: PCT/EP2015/069914
§ 371 (c)(1),
(2) Date: Feb. 28, 2017

(87) PCT Pub. No.: WO2016/034567
PCT Pub. Date: Mar. 10, 2016

(65) Prior Publication Data
US 2017/0282664 A1    Oct. 5, 2017

(30) Foreign Application Priority Data

Sep. 1, 2014 (GB) .................................. 1415414.0
Sep. 1, 2014 (GB) .................................. 1415415.7

(51) Int. Cl.
*B60G 15/06* (2006.01)
*F16F 9/58* (2006.01)

(52) U.S. Cl.
CPC .............. *B60G 15/067* (2013.01); *F16F 9/58* (2013.01); *B60G 2204/125* (2013.01);
(Continued)

(58) Field of Classification Search
CPC .............. B60G 15/067; B60G 2206/42; B60G 2204/125; B60G 2206/41;
(Continued)

(56) References Cited

U.S. PATENT DOCUMENTS 2,405,458 A    8/1946  Slack et al.
4,934,730 A *  6/1990  Okuzumi .............. B60G 15/068
                                                    267/220

(Continued)

FOREIGN PATENT DOCUMENTS

CN        203198672 U      9/2013
DE    102011116899 A1      4/2012

(Continued)

OTHER PUBLICATIONS

Combined Search and Examination Report for application No. GB1415415.7, dated Feb. 26, 2015, 6 pages.

(Continued)

*Primary Examiner* — Darlene P Condra
(74) *Attorney, Agent, or Firm* — Reising Ethington P.C.

(57) ABSTRACT

A spring aid assembly for a vehicle suspension system. The spring aid assembly includes: a housing having a generally cylindrical cavity formed therein, a damper including a rod extending through a cap, and a spring aid having a proximal end retained within the cavity of the housing, a distal end extending in an axial direction away from the housing, and an outer circumferential groove formed therein. The cavity in the housing is bounded by a generally cylindrical inner peripheral wall that has a plurality of axially and radially extending projections extending therefrom. A ring is positioned in the outer circumferential groove of the spring aid. The ring provides a positive stop to the spring aid assembly (Continued)

and prevents the cap of the damper from coming into direct contact with the housing during full compression of the damper.

20 Claims, 10 Drawing Sheets

(52) U.S. Cl.
CPC ............ *B60G 2204/128* (2013.01); *B60G 2204/4502* (2013.01); *B60G 2204/45021* (2013.01); *B60G 2206/41* (2013.01); *B60G 2206/42* (2013.01)

(58) Field of Classification Search
CPC ...... B60G 2204/4502; B60G 2204/128; B60G 2204/45021; F16F 9/58
See application file for complete search history.

(56) References Cited

U.S. PATENT DOCUMENTS

| | | | |
|---|---|---|---|
| 6,296,237 B1 | 10/2001 | Nagai | |
| 9,802,454 B2* | 10/2017 | Wilkin | F16F 1/12 |
| 2004/0178552 A1* | 9/2004 | Schudt | B60G 15/068 |
| | | | 267/220 |
| 2006/0082037 A1* | 4/2006 | Al-Dahhan | B60G 11/15 |
| | | | 267/179 |
| 2006/0125164 A1* | 6/2006 | Mansueto | B60G 15/068 |
| | | | 267/220 |
| 2006/0279031 A1 | 12/2006 | Schleck et al. | |
| 2008/0023931 A1* | 1/2008 | Myers | B60G 11/28 |
| | | | 280/124.157 |
| 2008/0197552 A1* | 8/2008 | Winocur | B60G 15/068 |
| | | | 267/195 |
| 2009/0166940 A1 | 7/2009 | Lutz | |
| 2009/0315292 A1* | 12/2009 | Winocur | B60G 15/068 |
| | | | 280/124.146 |
| 2010/0025903 A1 | 2/2010 | Thye-Moormann | |
| 2012/0193850 A1* | 8/2012 | Szekely | F16F 1/3732 |
| | | | 267/292 |
| 2012/0292842 A1* | 11/2012 | Van Der Zyppe | F16F 9/58 |
| | | | 267/292 |
| 2014/0131961 A1* | 5/2014 | Moore | B60G 15/062 |
| | | | 280/6.157 |

FOREIGN PATENT DOCUMENTS

| | | |
|---|---|---|
| EP | 2669544 A1 | 12/2013 |
| FR | 2823699 A1 | 10/2002 |

OTHER PUBLICATIONS

International Search Report for International application No. PCT/EP2015/069914, dated Oct. 27, 2015, 4 pages.
Written Opinion for International application No. PCT/EP2015/069914, dated Oct. 27, 2015, 6 pages.
Chinese Office Action for application No. 201580054667.2, dated Aug. 28, 2018, 28 pages.

* cited by examiner

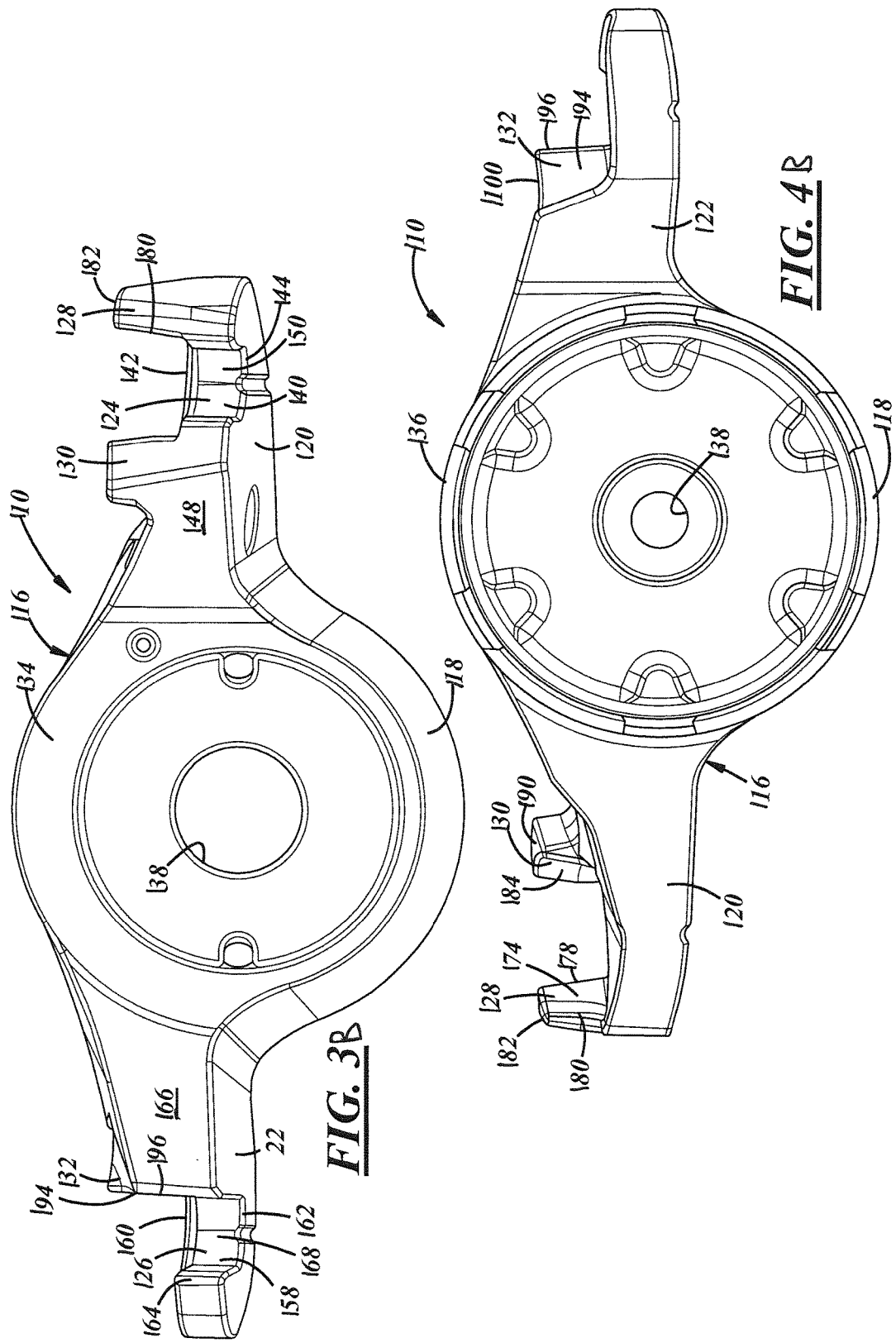

SPRING AID ASSEMBLY FOR A VEHICLE SUSPENSION SYSTEM

TECHNICAL FIELD

The present disclosure relates to a spring aid assembly for a vehicle suspension system. Aspects of the invention relate to a spring aid assembly, to a suspension system, and to a vehicle.

BACKGROUND

Suspension systems of automotive vehicles are positioned between a vehicle body and its wheels to isolate the vehicle body from vibrations and impacts from a road surface. Such systems typically include springs to absorb the vibrations and impacts from the road surface and dampers (or shock absorbers) to dampen oscillations from the springs. Bumpers, also referred to as bump stops, bump rubbers, spring aids, or jounce bumpers, are commonly used to prevent direct metal-to-metal contact between various components of suspension systems, which may occur, for example, when the suspension systems approach their maximum travel limits, i.e., full compression or full extension. For example, bumpers are traditionally positioned around piston rods of hydraulic dampers to prevent metal-to-metal contact between the damper and a top mount during full compression of the damper.

However, due to vehicle packaging constraints, it may be desirable to reduce the size and/or weight of conventional vehicle suspension systems. For example, it may be desirable to reduce the height and/or width of the bumper that is conventionally positioned between the damper and the top mount, but doing so may introduce difficulties in maintaining a minimum amount of clearance between the damper and the top mount, especially during extreme compression events associated with severe irregularities in the road surface. In some situations, it may be beneficial to reduce the height and/or width of the damper itself, but doing so may decrease the surface area of the damper that interfaces with the top mount, which may concentrate the load inputted to the top mount by the damper during a compression stroke. Concentrating the load transferred to the top mount during compression of the damper may cause the top mount to experience excessive wear at the location of the concentrated load.

In addition, vehicles such as automobiles are typically equipped with damper assemblies, also known as shock absorbers, at each wheel. The damper assemblies are part of a larger suspension system, and are used to dampen spring oscillations emitted from a spring, like a coil spring, of the suspension system. At one end, the damper assemblies are usually joined to a moving suspension component, and at another end, the damper assemblies are usually joined to an automotive structure like an automotive body, frame, or subframe.

In the assembly or decking procedure, the joint to the suspension component is sometimes made before the joint to the automotive structure, and the joint to the suspension component is commonly situated substantially vertically or vertically below the joint to the automotive structure. The joint at the automotive structure involves a mount, a stud, a nut, and/or a washer. Initially, the mount and stud are brought together and the nut is only manually fastened on the stud in order to temporarily hold the mount and stud together. Before final fastening, however, the manually-fastened joint can come apart and the mount can lose its place relative to the stud. Moreover, the stud is typically inserted through a hole that is closed around its sides so that the stud and hole must be in-line with the stud's terminal end inserted first into the hole. This can call for an alignment step in the decking procedure.

Still other applications involving joints, such as non-automotive applications, may have a similar assembly procedure and can consequently experience similar issues.

Accordingly, it is an aim of the present invention to address, for example, the disadvantages identified above.

SUMMARY OF THE INVENTION

According to an aspect of the present invention there is provided a spring aid assembly for a vehicle suspension system having a top mount and a damper that includes a housing with a cap and a rod that extends out of the housing through the cap, the top mount having an inner peripheral wall defining a central axis and a cavity in which are located a plurality of inwardly extending projections, the spring aid assembly comprising: a spring aid having a proximal end, a distal end, a central passageway extending from the proximal end to the distal end, and a circumferential groove in an outer surface of the spring aid, the proximal end including a plurality of recesses that mate with the projections of the top mount, the spring aid being configured such that, in use, the proximal end fits within the cavity of the top mount with the projections of the top mount positioned within the recesses of the spring aid, and the distal end extends in an axial direction out and away from the cavity, with the rod extending from the damper through the passageway to the top mount; and a ring positioned in the circumferential groove of the spring aid, said ring providing a travel stop to the vehicle suspension system that prevents the cap from coming into direct contact with the top mount during compression of the damper.

The inner peripheral wall may be generally cylindrical.

According to a further aspect of the invention, there is provided a spring aid assembly for a vehicle suspension system having a top mount and a damper that includes a housing with a cap and a rod that extends out of the housing through the cap. The top mount has a generally cylindrical inner peripheral wall defining a central axis and a cavity therein, with the inner peripheral wall having a plurality of axially and radially extending projections extending therefrom. The spring aid assembly comprises a spring aid and a ring positioned in a circumferential groove of the spring aid. The spring aid has a proximal end, a distal end, a central passageway extending from the proximal end to the distal end, with the circumferential groove being located in an outer surface of the spring aid. The proximal end includes a plurality of recesses that mate with the projections of the top mount. The spring aid is configured such that, in use, the proximal end fits within the cavity of the top mount with the projections of the top mount positioned within the recesses of the spring aid, and the distal end extends in an axial direction out and away from the cavity, with the rod extending from the damper through the passageway to the top mount. In use, the ring provides a travel stop to the vehicle suspension system that prevents the cap from coming into direct contact with the top mount during compression of the damper.

According to another aspect of the invention, there is provided a vehicle suspension system that includes a top mount, damper, spring aid, and ring positioned in a circumferential groove of the spring aid. The top mount has an axial bore extending therethrough along a central axis and a generally cylindrical cavity formed in a bottom portion thereof. The cavity in the bottom portion of the top mount is bounded by a generally cylindrical inner peripheral wall that has a plurality of axially and radially extending projections extending inwardly therefrom. The spring aid has a proximal end retained within the cavity of the top mount, a distal end extending in an axial direction away from the top mount, a central passageway extending from the proximal end to the distal end, and includes the circumferential groove in an outer surface of the spring aid. The damper includes a housing and a rod extending out of the housing through a cap at one end of the housing. The rod of the damper extends through the passageway of the spring aid and is received in the bottom portion of the top mount and extends at least part way through the axial bore of the top mount. In use, the ring provides a travel stop to the vehicle suspension system that prevents the cap from coming into direct contact with the top mount during compression of the damper.

According to yet another aspect of the invention there is provided a vehicle that includes the spring aid assembly described herein.

According to yet another aspect of the invention there is provided a vehicle that includes the vehicle suspension system described herein.

Optional features of the various aspects of the invention are set out below in the dependent claims.

According to an aspect of the invention, there is provided an assembly mount that includes a body. The body has a recess with a first open side, a second open side, a closed end, and an open end. The body also has at least one retention wall. The retention wall is located adjacent the first open side and adjacent the open end. In an assembly procedure, the recess receives a stud by way of its open end. The stud extends through the first and second open sides. The retention wall keeps the position of the stud in the recess via surface-to-surface abutment between the retention wall and a nut, a washer, or a head of the stud before the stud is put in a finally-fastened state.

A further aspect of the invention provides an assembly mount, comprising: a body having a recess with a first open side, a second open side opposite said first open side, a closed end, and an open end, said body having at least one retention wall adjacent said first open side and adjacent said open end. Said recess receives a stud via said open end, the stud extending through said first and second open sides, said at least one retention wall retaining the stud in said recess via surface-to-surface abutment between said at least one retention wall and a nut, a washer, or a head of the stud before the stud is in a finally-fastened state.

It may be that at least one retention wall includes a first retention wall adjacent said first open side and adjacent said open end, and includes a second retention wall adjacent said first open side and adjacent said open end and generally opposite said first retention wall with respect to said open end, and the surface-to-surface abutment occurs between said first and second retention walls and the nut, washer, or head of the stud. A shortest distance between said first and second retention walls may be greater than a diameter of the stud and less than a width of the nut, of the washer, or of the head.

It may be that an opening dimension at said open end is greater than a diameter of the stud and less than a width of the nut, of the washer, or of the head.

It may be that said body has a seat surface for the nut, washer, or head, said seat surface spanning from said recess at said first open side and adjacent said closed end.

It may be that at least one retention wall is located along at least part of a periphery of said seat surface.

It may be that each of said first and second retention walls has a retention surface abutting the nut, washer, or head, said retention surfaces spanning between a first end at said open end and a second end away from said open end. A shortest distance between said first ends of said retention surfaces of said first and second retention walls may be less than a shortest distance between said second ends of said retention surfaces of said first and second retention walls.

It may be that the assembly mount is a vehicle damper assembly top mount and the stud is a vehicle structure stud, the vehicle damper assembly top mount comprising said body with a first recess and a second recess, said first recess, said second recess, or both of said first and second recesses having said first and second retention walls.

A further aspect of the invention provides a vehicle suspension system comprising the vehicle damper assembly top mount as described above.

A still further aspect of the invention provides a vehicle comprising the assembly mount as described above.

According to an aspect of the invention, there is provided a method of assembling a vehicle assembly mount and a stud. The method comprises bringing the vehicle assembly mount vertically up toward the stud. The vehicle assembly mount includes a body having a recess. The recess has a first open side, a second open side, a closed end, and an open end. The body has a retention wall located adjacent the first open side and adjacent the open end. The method also comprises inserting the stud in the recess by way of the open end. When inserted, the stud extends through the first and second open sides. The method further comprises at least partially fastening a nut, a washer, or both a nut and washer over the stud. The stud is retained in the recess via surface-to-surface abutment between the retention wall and the nut, the washer, or both the nut and washer.

It may be that said open end is located at an upper surface of said body.

It may be that said retention wall includes a first retention wall adjacent said first open side and adjacent said open end, and a second retention wall adjacent said first open side and adjacent said open end and generally opposite said first retention wall with respect to said open end.

It may be that at least partially fastening the nut, the washer, or both the nut and washer over the stud involves fastening manually by an assembler.

It may be that the vehicle assembly mount is a vehicle damper assembly top mount and the stud is a vehicle structure stud, and the method of assembling the vehicle damper assembly top mount is carried out after a lower part of the vehicle damper assembly is already assembled to a vehicle component.

According to an aspect of the invention, there is provided a vehicle damper assembly top mount that includes a body with a first recess and a second recess. Each of the first and second recesses has a first open side, a second open side, a closed end, and an open end. The body also has a first retention wall and a second retention wall at the first recess, at the second recess, or at both the first and second recesses. The first retention wall is located adjacent the first open side and adjacent the open end. The second retention wall is located adjacent the first open side, adjacent the open end, and generally opposite the first retention wall relative to the open end. A shortest distance between the first and second retention walls is greater than a diameter of a stud received in the respective recess and is less than a width of a nut fastened to the stud, of a washer on the stud, or of both.

It may be that each of said first and second retention walls has a retention surface confronting the nut or washer in assembly, said retention surfaces spanning between a first end at said open end and a second end away from said open end.

It may be that a shortest distance between said first ends of said retention surfaces of said first and second retention walls is less than a shortest distance between said second ends of said retention surfaces of said first and second retention walls.

It may be that said body has a seat surface at said first recess, at said second recess, or at both said first and second recesses for the nut or washer, said seat surface spanning from said recess at said first open side and adjacent said closed end, and said first and second retention walls are located along at least part of a periphery of said seat surface.

Within the scope of this application it is expressly intended that the various aspects, embodiments, examples, and alternatives set out in the preceding paragraphs, in the claims, and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3B is a top view of the assembly mount of FIG. 1B;

FIG. 4B is a bottom view of the assembly mount of FIG. 1B;

DETAILED DESCRIPTION

Figure 1A:
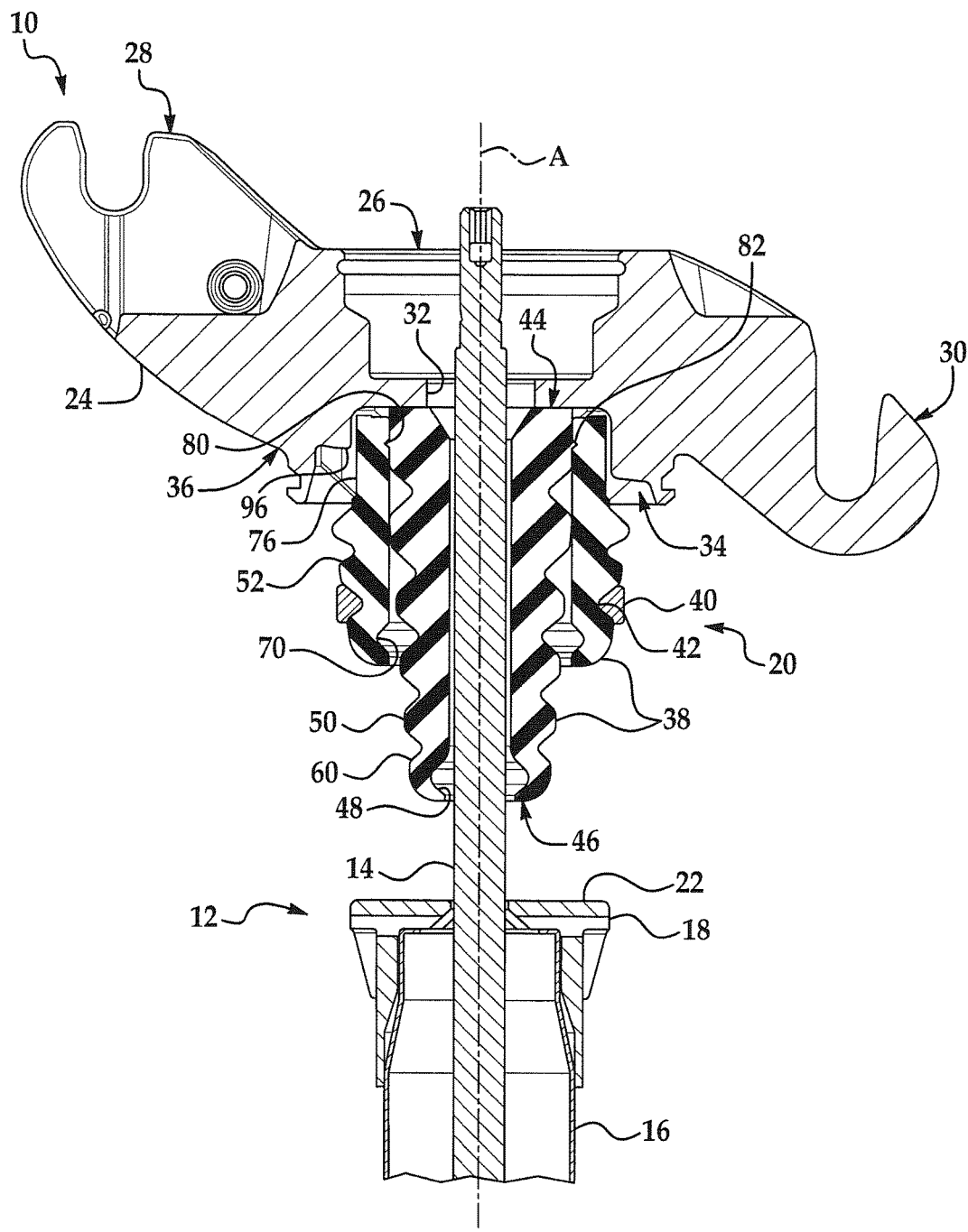
FIG. 1A is a schematic cross-sectional view of a portion of a vehicle suspension system including a top mount, a damper, and a spring aid assembly, in accordance with one embodiment of the invention.

FIG. 1A illustrates an upper portion of a vehicle suspension system including a top mount 10, a damper 12, and a spring aid assembly 20. The top mount 10 attaches the damper 12 to a portion of the vehicle body (not shown) with the damper operating in use to dampen movement of the vehicle body relative to the vehicle wheel (not shown) riding over the road or other ground surface. The spring aid assembly 20 performs a plurality of functions, including controlling the spring rate of the suspension system as it nears full jounce, and providing a positive travel limit in a manner that prevents direct engagement of the damper 12 with the top mount 10.

Damper 12 may be pivotally attached to the top mount 10 and includes a piston rod 14 extending out of a housing 16 through a cap 18 positioned over an upper end portion of the housing 16. The damper 12 may be a conventional damper with the housing 16 forming part of a hydraulic cylinder holding a piston (not shown) connected to the piston rod 14. The cap 18 may be configured to help locate the piston rod 14 in the housing 16 and to provide a fluid-tight seal around the rod 14.

Spring aid assembly 20 is positioned around the piston rod 14 between the top mount 10 and the cap 18, and is configured to seat within an interior portion of the top mount 10 as will be described below. During vehicle use, when the suspension is sufficiently compressed the spring aid assembly 20 will engage a bump surface 22 of the cap 18 thereby controlling the spring rate of further suspension compression and ultimately, at full jounce, preventing metal-to-metal contact between the top mount 10 and the cap 18.

Although not shown in the drawings, a dust boot may be provided over the damper 12 to shield the spring aid assembly 20, the piston rod 14, and the sealing area around the rod 14 of the damper 12 from exposure to dirt, dust, mud and other debris. In addition, a spring, e.g., a coil spring, may be mounted in parallel with the damper 12 as part of a suspension system for a vehicle.

The particular details of the construction and use of the top mount 10, damper 12 and spring aid assembly 20 will now be described. In the following discussion and in the claims, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a passageway), while the terms "radial" and "radially" generally mean perpendicular to the central axis.

The top mount 10 includes a body 24 with a central region 26 and a pair of arm regions 28, 30 extending therefrom. The central region 26 of the body 24 has an axial bore 32 extending therethrough along a central axis A, and a shallow cylindrical cavity 34 formed in a bottom portion 36 thereof. The axial bore 32 and the cavity 34 of the top mount 10 are aligned with each other along the central axis A and are configured to receive the rod 14 of the damper 12 therethrough. The arm regions 28, 30 of the top mount 10 may be configured to couple the top mount 10 to a vehicle structure (not shown), e.g., a vehicle body, frame, or sub-frame. In other embodiments, the top mount 10 may not include arm regions, but may be attached or otherwise integrated into the vehicle in other ways. The housing may be made of metal, e.g., aluminum or an aluminum alloy, and may be formed by die-casting, or by any other suitable method.

Figure 2A:
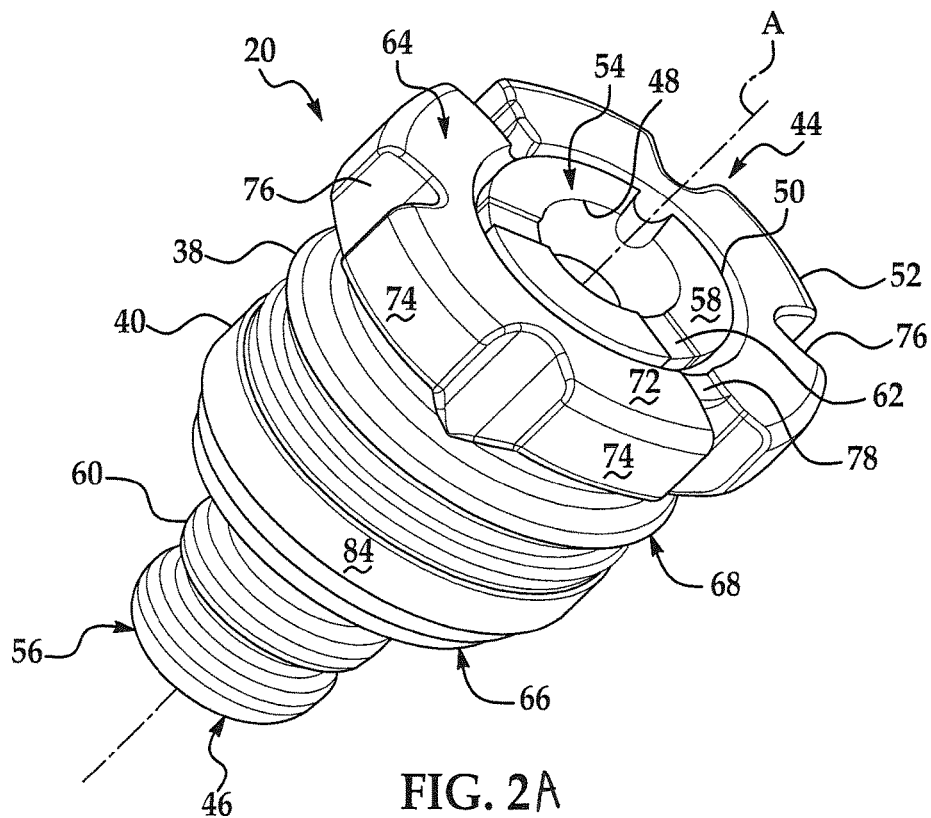
FIG. 2A is a schematic perspective view of the spring aid assembly of FIG. 1A.
Figure 3A:
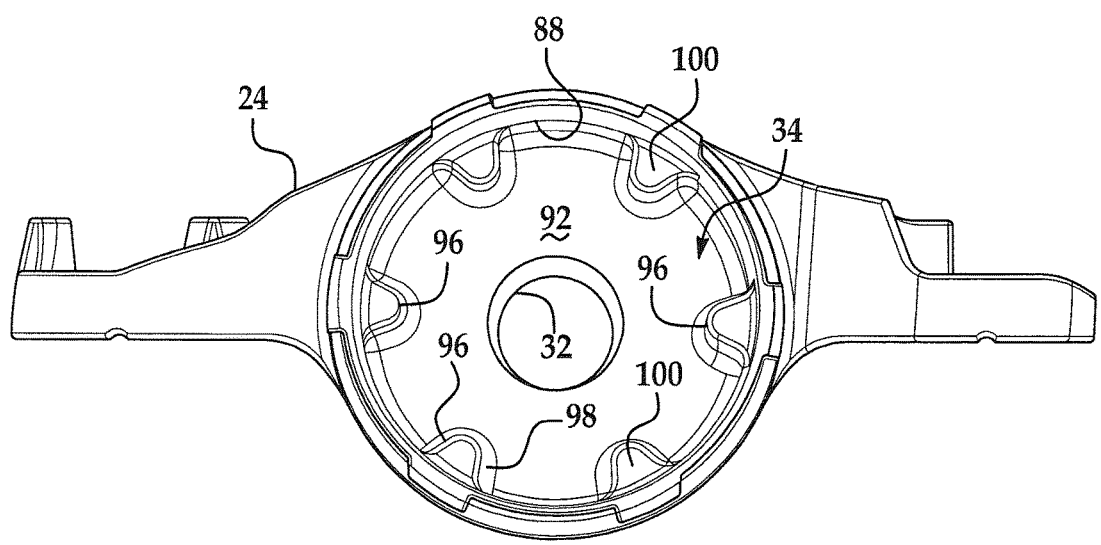
FIG. 3A is a bottom perspective view of the top mount of FIG. 1A.

Referring now also to FIG. 2A, the spring aid assembly 20 is substantially symmetrical about a central longitudinal axis A thereof and includes a compressible spring aid 38 and a ring 40 positioned in an outer circumferential groove 42 of the spring aid 38. The spring aid 38 has a proximal end 44, a distal end 46, and a central bore or passageway 48 for receiving the rod 14 of the damper 12 therethrough. The proximal end 44 of the spring aid 38 is retained within the cavity 34 in the bottom portion 36 of the top mount 10 and the distal end 46 of the spring aid 38 extends away from the top mount 10 along the central axis A. When assembled and in an uncompressed state, the central longitudinal axis A of the spring aid assembly 20, including the spring aid 38 and the ring 40, is coaxial with the central axis A of the top mount.

The spring aid 38 is configured to interface with the top mount 10 and with the bump surface 22 of the cap 18 during compression of the damper 12 to gradually decelerate the axial movement of the rod 14 as the damper 12 nears its end of travel and is fully compressed. In the illustrated embodiment, the spring aid 38 is a two part component that is assembled together after each component is separately formed. In other embodiments, the spring aid may be a unitary component molded or otherwise formed from a single, continuous piece of material. As shown, the spring aid 38 includes an inner tubular member 50 and an outer sleeve 52. The inner tubular member 50 has a proximal end 54, a distal end 56, a top surface 58, and an exterior surface 60. The proximal end 54 of the inner tubular member 50 may include one or more drainage channels 62, for example, for water drainage. The proximal and/or distal ends 54, 56 of the inner tubular member 50 may include a plurality of annular convolutions (peaks and valleys), which may allow the inner tubular member 50 to be efficiently compressed in the axial direction by the cap 18 as the damper 12 nears its end of travel. The inner tubular member 50 may be tapered along its length, and may decrease in cross-section from its proximal end 54 to its distal end 56. For example, as shown in FIG. 1A, the radius of adjacent peaks may decrease in the direction running from the proximal end 44 to the distal end 46 of the spring aid 38.

The outer sleeve 52 is generally cylindrical in shape and is coaxially positioned around the proximal end 54 of the inner tubular member 50. The outer sleeve 52 has a proximal end 64, a distal end 66, a central section 68 extending between the proximal and distal ends 64, 66, and an interior surface 70 that faces toward the exterior surface 60 of the inner tubular member 50. The proximal end 64 of the outer sleeve 52 has an annular top surface 72 and an axially extending outer peripheral surface 74. A plurality of peripherally spaced recesses 76 are formed in the proximal end 64 of the outer sleeve 52, along the outer peripheral surface 74 thereof. The recesses 76 extend radially inwardly from the outer peripheral surface 74, toward the central axis A, and extend in an axial direction from the top surface 72, toward the central section 68 of the outer sleeve 52. In use, the recesses 76 in the proximal end 64 of the outer sleeve 52 mate with projections 96 (described below) in the cavity 34 of the top mount 10, and help prevent rotation of the spring aid 38 within the cavity 34 of the body 24. The proximal end 64 of the outer sleeve 52 may include one or more drainage channels 78, for example, for water drainage. The central section 68 and/or the distal end 66 of the outer sleeve 52 may include one or more annular convolutions, which may allow the outer sleeve 52 to be efficiently compressed in the axial direction by the cap 18 as the damper 12 nears its end of travel.

In the illustrated embodiment, the inner tubular member 50 and the outer sleeve 52 are discrete components and are secured to each other at their proximal ends 54, 64. In particular, the proximal end 64 of the outer sleeve 52 has an annular groove 80 that is configured to receive in snap-fit relation an annular bead 82 that extends radially outwardly from the proximal end 54 of the inner tubular member 50. In other embodiments, the inner tubular member 50 and the outer sleeve 52 may be of unitary construction, and may be formed from a single, continuous piece of material.

The spring aid 38 may be made of any suitable material. For example, the spring aid 38 may be made of an elastomeric material, e.g., a cellular polyurethane. The stiffness and/or density of the inner tubular member 50 may be the same as or different from the density of the outer sleeve 52, and may be designed to provide certain desired ride characteristics and control to the vehicle suspension system. For example, the density of the outer sleeve 52 may be greater than that of the inner tubular member 50. In such case, the relatively low density of the inner tubular member 50 may provide adequate feel and vehicle ride quality during normal driving conditions, and the relatively high density of the outer sleeve 52 may provide the spring aid 38 with sufficient energy capacity to manage high-intensity impacts associated with severe irregularities in the road surface. Designing the spring aid 38 in this way may allow for an overall reduction in the length of the spring aid 38, without sacrificing the vehicle ride quality and control of the vehicle suspension system.

The ring 40 provides a positive stop to the spring aid assembly 20 by limiting axial travel of the rod 14 of the damper 12 and by affecting axial and radial compression of the spring aid 38 during a compression stroke of the damper 12. This ensures that a minimum amount of clearance is maintained between the cap 18 of the damper 12 and the body 24 at full compression of the damper 12. The ring 40 has top and bottom surfaces that each define a plane. In this description, the ring 40 has a generally cylindrical outer peripheral surface 84 and a convex or wedge-shaped inner peripheral surface 86, although other shapes are certainly possible. The ring 40 may have an inner diameter that is less than the width of the cap 18 of the damper 12 so as to prevent the cap 18 from passing through the ring 40 during compression of the damper 12. This may allow the width of the cap 18 of the damper 12 to be reduced without sacrificing the functionality of the spring aid 38. At the same time, the ring 40 may have an outer diameter that is greater than the width of the cap 18 of the damper 12, which may allow for a more even distribution of force between the cap 18 of the damper 12 and top mount 10 during a compression stroke of the damper 12.

The ring 40 may be secured around the spring aid 38 by being snapped into the outer circumferential groove 42. In such case, the outer diameter of the distal end 66 of the spring aid 38 at the location of the outer circumferential groove 42 may be similar to, or slightly larger than the inner diameter of the ring 40. When the damper 12 and the spring aid 38 are in a substantially uncompressed state, the central axis A of the ring 40 is coaxial with the central axis A of the body 24. The ring 40 may be made of a material that is more rigid than the material from which the spring aid 38 is made. For example, the ring 40 may be made of metal, e.g., aluminum (Al).

The ring 40 is positioned around the distal end 66 of the outer sleeve 52. However, in other embodiments, the ring 40 may be less distally-positioned and more medially or proximally-positioned along the length of the outer sleeve 52. It may be desirable to position the ring 40 at different locations along the length of the spring aid 38, for example, to modify and/or control the ride characteristics of the vehicle suspension system. For example, positioning the ring 40 closer to the distal end 66 of the outer sleeve 52 allows the spring rate of the spring aid 38 to be increased earlier in the compression stroke of the damper 12, and vice versa.

Referring now to FIGS. 3A-5A, the cavity 34 in the bottom portion 36 of the top mount 10 is bounded by a generally cylindrical inner peripheral wall 88 having an inner peripheral surface 90, an annular top wall 92, and a bottom opening 94. A plurality of ribs or projections 96 are formed on the inner peripheral surface 90 of the peripheral wall 88. The projections 96 are spaced apart from one another along the inner peripheral wall 88 of the top mount body 24 and extend radially inwardly from the inner peripheral wall 88, toward the central axis A. Also, the projections 96 extend in an axial direction from the top wall 92 of the body 24 toward the opening 94. The projections 96 may have curved outer surfaces 98 and oblique bottom surfaces 100.

The oblique bottom surfaces 100 of the projections 96 lie in substantially the same plane as one another and form an oblique interface or plane $P_1$ within the cavity 34 of the top mount 10. The oblique plane $P_1$ formed by the oblique bottom surfaces 100 extends at an acute angle ($\Theta$) with respect to a transverse axis B perpendicular to the central axis A. The acute angle ($\Theta$) formed between the oblique plane $P_1$ and the transverse axis B may correspond to, and will typically be the same as, the angle ($\Theta'$) between the central axis A and a pivot axis C of the damper 12. The angle ($\Theta$) may be selected as desired for a particular vehicle application. For example, in one embodiment, the angle ($\Theta$) may be about 7°. In other embodiments, the angle may be more or less.

In some embodiments, the projections 96 may be a unitary part of the body 24 of top mount 10, i.e., formed along with the remainder of top mount 10 from a single piece of material. For example, the projections 96 and the body 24 may be formed as a homogenous one-piece unitary part by a metal casting process. Alternatively, the body 24 may be formed as a homogenous one-piece unitary part without the projections 96, and then the projections 96 may be thereafter welded or otherwise attached to the inner peripheral surface 90 of the body 24 to form an integral part. In other embodiments, the projections may be incorporated into a separate component that is thereafter pressed into or otherwise attached to a recess in the body 24; such component may be metal, plastic or other suitable material. For example, a stamped or deep draw cup having the projections formed therein could be made and fixed in the recess of the body 24, in which case the top mount 10 would be a two or more piece component with the inner peripheral wall of the cup therefore substantially defining the cavity into which the spring aid assembly 20 is located.

The number of projections 96 formed along the inner peripheral wall 88 of the body 24 may vary, and may depend upon, for example, the magnitude of the force exerted during full jounce and/or on the size of the projections 96 themselves. The number of projections 96 may be increased, for example, to provide for a more even distribution of force between the cap 18 and the top mount 10 during full jounce. In this description, six (6) radially and axially extending projections 96 are formed along the inner peripheral wall 88 of the body 24; however, the inner peripheral wall 88 of the body 24 may include more than six (6) or less than six (6) projections 96 depending upon the application.

The number of recesses 76 formed in the proximal end 64 of the outer sleeve 52 will correspond to, and will typically be the same as, the number of projections 96. In addition, the recesses 76 may be sized and shaped to form an interference fit with the projections 96. This may allow the spring aid assembly 20 to be secured to the body 24 by press-fitting the proximal end 64 of the outer sleeve 52 into the cavity 34 in the bottom portion 36 of the body 24 such that the recesses 76 elastically deform to accommodate the projections 96 therein. Attaching the spring aid assembly 20 to the body 24 in this way may help prevent the spring aid 38 from bulging over the ring 52 and the cap 18 during compression of the damper 12.

Figure 6A:
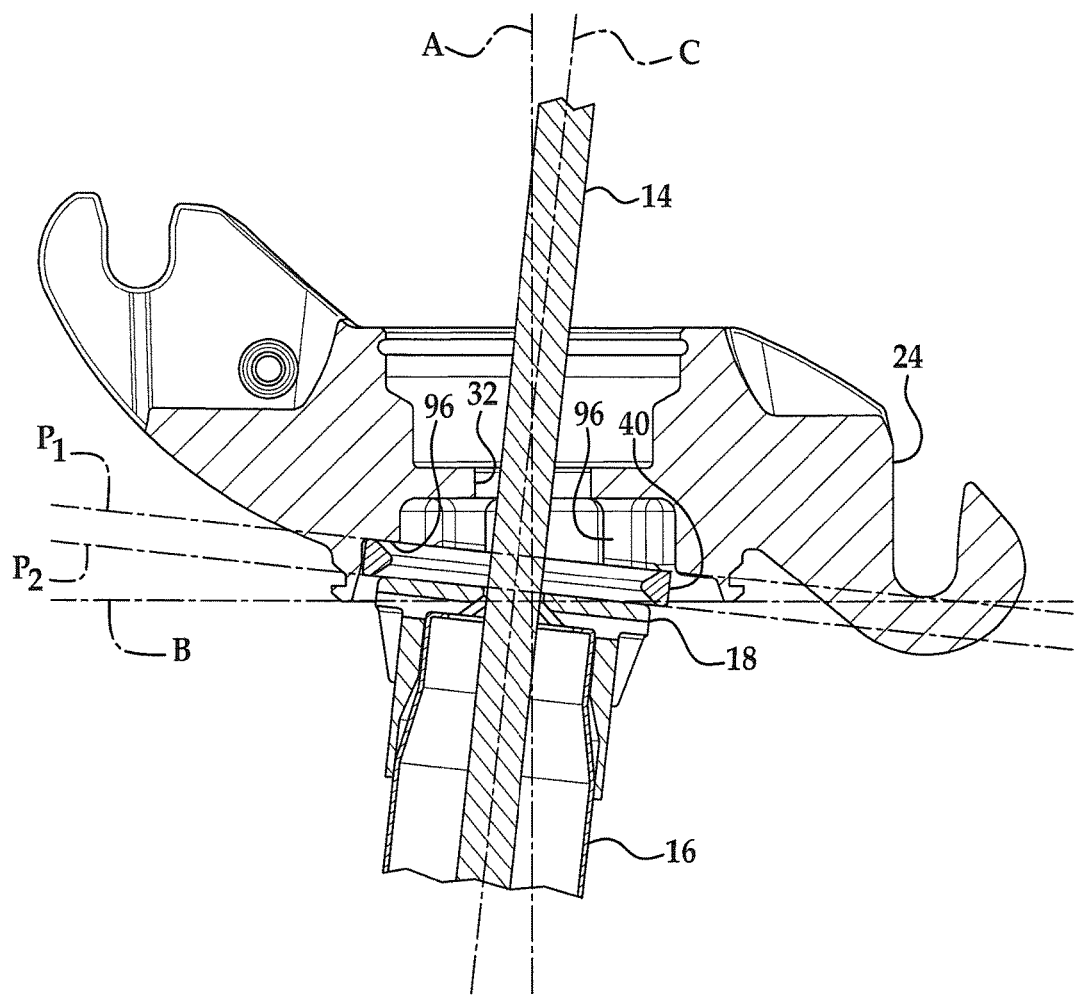
FIG. 6A is a schematic cross-sectional view of a portion of the vehicle suspension system of FIG. 1A, shown in full compression.
Figure 7A:
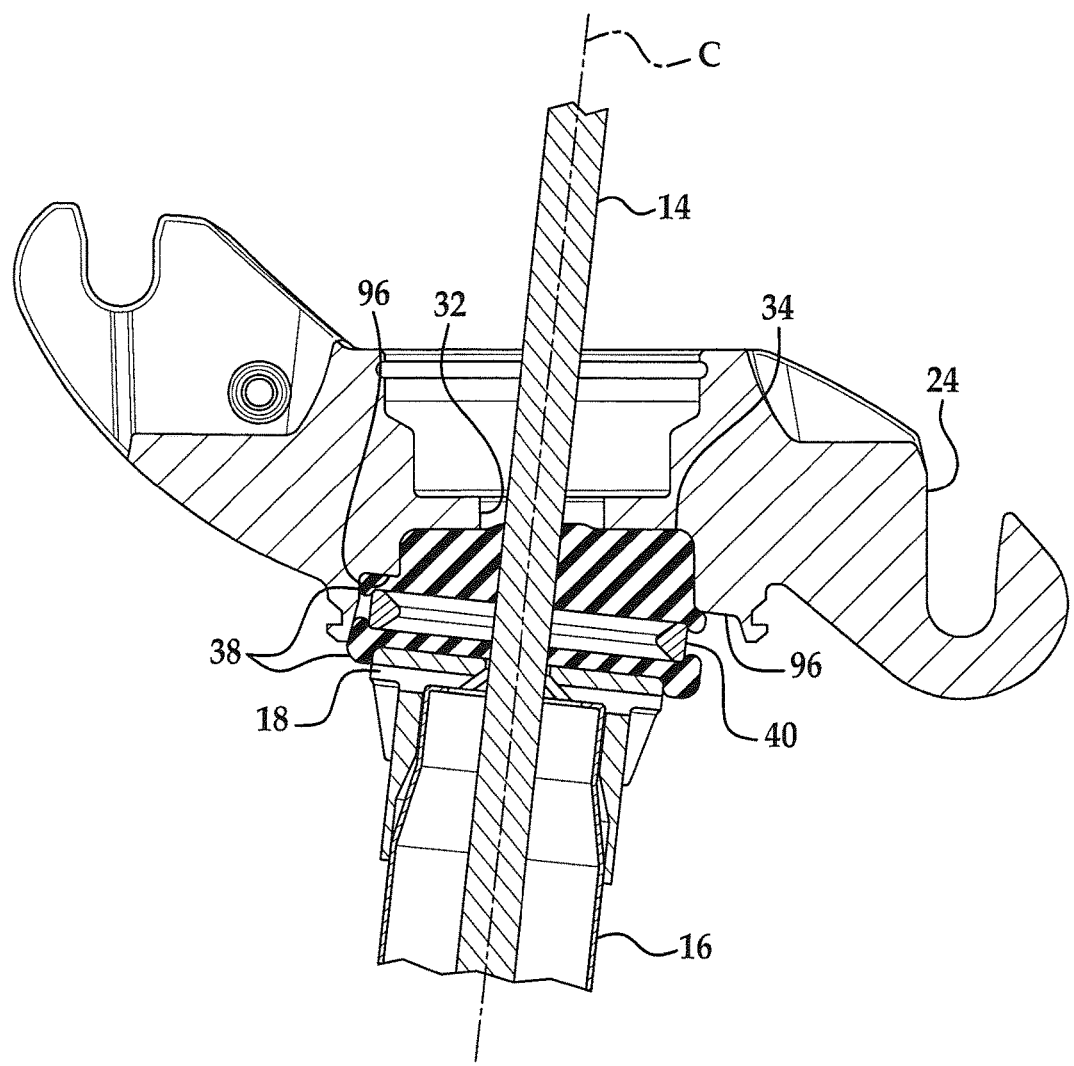
FIG. 7A is a schematic cross-sectional view of the vehicle suspension system of FIG. 1A, shown in full compression.

FIGS. 6A and 7A are schematic illustrations of the damper 12 in a fully compressed position. In FIG. 6A, the spring aid 38 has been omitted to better illustrate the plane $P_1$ formed by the oblique bottom surfaces 100 of the projections 96, the plane $P_2$ formed by the bump surface 22 of the cap 18, the interface between the top surface of the ring 40 and the oblique bottom surfaces 100 of the projections 96, and the interface between the bottom surface of the ring 40 and the bump surface 22 of the cap 18 during full compression of the damper 12. As shown, when the damper 12 approaches full compression, the plane $P_2$ formed by the bump surface 22 of the cap 18 is aligned with and substantially parallel to the plane $P_1$ formed by the oblique bottom surfaces 100 of the projections 96. As such, the force exerted on the top mount 10 by the cap 18 during compression of the damper 12 is more evenly distributed than would otherwise be the case if the bottom surfaces 100 of the projections 96 were parallel to the transverse axis B, or if the bump surface 22 of the cap 18 was misaligned with another stopping surface of the top mount 10. This may reduce the wear experienced by the damper 12 and by the body 24, which may lead to a longer life for the damper 12 and the top mount 10.

When the damper 12 starts to compress, the piston rod 14 is slidably received in the housing 16 and a bottom end of the damper 12 may begin to travel in a circular arc about a fixed axis on the top mount 10 or another component of the vehicle. This shifts at least the distal portion of the spring aid 38 and the rate ring 40 to one side of the cavity 34, as can be seen in FIG. 7A and by the position of the rate ring in FIGS. 5A and 6A. As the piston rod 14 nears the end of its compression stroke, the bump surface 22 of the cap 18 engages the distal end 46 of the inner tubular member 50 and compresses the inner tubular member 50 in a generally axial direction inside the outer sleeve 52. As the inner tubular member 50 is compressed into the outer sleeve 52, a radial force is exerted against the interior surface 70 of the outer sleeve 52 by the inner tubular member 50. At the same time, the ring 40 extending around the outer sleeve 52 restricts radial expansion of the sleeve 52 and thereby provides an increase in the spring rate of the spring aid 38. After the inner tubular member 50 is at least partially compressed inside the outer sleeve 52, the bump surface 22 of the cap 18 engages the distal end 56 of the outer sleeve 52 and compresses the outer sleeve 52 at least partially into the cavity 34 in the bottom portion 36 of the top mount 10. Since the inner tubular member 50 is at least partially compressed before compression of the outer sleeve 52 begins, the inner tubular member 50 may be referred to as a primary spring aid and the outer sleeve 52 may be referred to as a secondary spring aid.

As the spring aid 38 is compressed, the force necessary to compress the spring aid 38 increases until the spring aid 38 acts as a relatively incompressible solid. When the spring aid 38 reaches this point, axial travel of the ring 40 and the rod 14 of the damper 12 are stopped. When the damper 12 is fully compressed, the cap 18 indirectly rests via the now bulging spring aid 38 against the ring 40, and the ring 40 indirectly rests via the bulging spring aid 38 against one or more of the projections 96. Positioning the spring aid 38 between the bump surface 22 of the cap 18 and the body 24 helps to isolate the body of the vehicle from what might otherwise feel like a harsh impact. In addition, positioning the ring 40 around the spring aid 38 provides a positive travel stop to the spring aid assembly 20, which limits travel of the rod 14 and prevents the cap 18 from coming into direct contact with the body 24.

Referring to the drawings in FIGS. 1B to 8B, an assembly mount 110 is designed and constructed to maintain its position on a stud 112 before a nut 114 is finally and/or fully fastened to the stud. This is desirable in the midst of an assembly or decking procedure when the nut 114 is initially and temporarily fastened manually to the stud 112 by an assembler. The manual fastening is then succeeded by final fastening with a tool such as a nut-runner. Between the manual and final fastening steps, the assembly mount 110 keeps its place on the stud 112 via one or more retention wall(s) as detailed below. In this description, the assembly mount 110 is described as a vehicle damper assembly top mount for a vehicle damper assembly, but the assembly mount and its retention wall(s) could be employed in other applications in a vehicle and elsewhere in non-vehicle applications where a component is initially manually fastened and then finally fastened. The phrase "assembly mount" is meant to encompass all of these applications for vehicles and non-vehicles. Furthermore, the term "vehicle" encompasses automobiles like passenger cars, trucks, and sport utility vehicles (SUVs).

The vehicle damper assembly top mount 110, hereafter "top mount," may be equipped on the upper end of a tube and/or rod of a damper assembly. Depending on the type of damper assembly used, the top mount 110 can be equipped at other locations and to other components of the damper assembly. The damper assembly could be hydraulic-based, pneumatic-based, or another type. The damper assembly is typically a part of a larger vehicle suspension system that also conventionally includes a spring such as a coil spring. The top mount 110 can be designed and constructed in different ways depending upon, among other possible influences, the particular vehicle application and the design and construction of the stud 112 and nut 114. In the embodiment presented here, and referring to FIGS. 1B-4B, the top mount 110 has a body 116 with a central region 118 and a pair of arm regions 120, 122 extending from the central region. Further, the top mount 110 has a first recess 124, a second recess 126, a first retention wall 128, a second retention wall 130, and a third retention wall 132.

The central region 118 connects to a component of the damper assembly. It has an upper surface 134 and a lower surface 136, and has a bore 138 spanning between the upper and lower surfaces. The bore 138 receives the damper assembly component therethrough, which can be a rod or a tube or something else. To facilitate insertion of the damper assembly component, whatever the component may be, the bore 138 could include a cap, a bushing, a circlip, as well as other items. The first and second arm regions 120, 122 extend from opposite sides of the central region 118 and can be unitary extensions of the central region.

Referring now to FIGS. 1B-5B, the first recess 124 is defined in the first arm region 120 for receiving and joining with the stud 112. As presented here, the first recess 124 is generally u-shaped and has a recess wall 140 delineating its shape. The first recess 124 has a first open side 142 and a second open side 144 situated opposite the first open side so that the stud 112 can pass through the first recess. An open end 146 exposes the first recess 124 to the stud 112 at an upper surface 148 of the first arm region 120, and a closed end 150 is situated generally opposite and down from the open end. Lastly, a seat surface 152 is located at a front side 154 of the first arm region 120 and at the first open side 142. The seat surface 152 is a planar surface inset into the front side 154 for accommodating the nut 114 or a washer 156 in installation. It spans around the u-shaped periphery of the first recess 124 at the front side 154 and extends immediately from the recess wall 140. The seat surface 152 is somewhat annular to match the shape of the nut 114 or washer 156 that it accommodates.

Similarly, the second recess 126 is defined in the second arm region 122 for receiving and joining with another stud like the stud 112. As presented here, the second recess 126 is generally u-shaped and has a recess wall 158 delineating its shape. The second recess 126 has a first open side 160 and a second open side 162 situated opposite the first open side so that the stud can pass through the second recess. An open end 164 exposes the second recess 126 to the stud at an upper surface 166 of the second arm region 122, and a closed end 168 is situated generally opposite and down from the open end. Lastly, a seat surface 170 is located at a front side 172 of the second arm region 122 and at the first open side 160. The seat surface 170 is a planar surface inset into the front side 172 for accommodating a nut like the nut 114 or a washer like the washer 156 in installation. It spans around the u-shaped periphery of the second recess 126 at the front side 172 and extends immediately from the recess wall 158. The seat surface 170 is somewhat annular to match the shape of the nut or washer that it accommodates.

The retention walls 128, 130, 132 help maintain the position of the top mount 110 on the stud(s) 112 before the nut 114 is finally fastened down on the stud(s). In this way, the retention walls 128, 130, 132 serve to temporarily join the top mount 110 and stud(s) 112 together amid the accompanying assembly procedure. The retention walls 128, 130, 132 can have different designs and constructions for accomplishing this task. In the embodiment presented here, and referring now to FIGS. 1B, 3B, and 5B, the first and second retention walls 128, 130 are unitary extensions of the first arm region 120 and project laterally from the front side 154 thereof. The back side of the first arm region 120 lacks a similarly constructed wall. The first and second retention walls 128, 130 are situated near the first open side 142 of the first recess 124 and near the open end 146, and span partly around the u-shape of the first recess. Relative to each other, the first and second retention walls 128, 130 are located on opposite sides of the first recess 124. The first and second retention walls 128, 130 are set a distance from the transition between the recess wall 140 and seat surface 152, and begin to project laterally at a periphery 174 of the seat surface. The retention walls 128, 130 do not span completely around the periphery 174, but could in other embodiments. Indeed, in embodiments not depicted in the figures, the first and second retention walls 128, 130 could be unitary extensions of each other and could therefore form a continuous wall around the first recess 124.

The first retention wall 128 has a first retention surface 176 generally confronting the first recess 124. The first retention surface 176 spans between a first end 178 and a second end 180, and between a base of the first retention wall 128 to its terminal end 182. In this embodiment the first end 178 is situated at the open end 146 of the first recess 124. Between the first and second ends 178, 180, the first retention surface 176 has a curved surface contour to generally match a profile of the nut 114 or the washer 156 that is set thereat in installation. Likewise, the second retention wall 130 has a second retention surface 184 generally confronting the first recess 124. The second retention surface 184 spans between a first end 186 and a second end 188, and between a base of the second retention wall 130 to its terminal end 190. Here too, the first end 186 is situated at the open end 146 of the first recess 124. Between the first and second ends 186, 188, the second retention surface 184 has a curved surface contour to generally match the profile of the nut 114 or the washer 156 that is set thereat in installation.

In order to receive insertion of the stud 112 within the first recess 124 and yet capture the nut 114 or the washer 156 between them, the first and second retention walls 128, 130 are narrower at their first ends 178, 186 and wider at their second ends 180, 188. In particular, and referring to FIG. 5B, the first ends 178, 186 are spaced apart from each other by a shortest distance $D_1$ that is less than a shortest distance $D_2$ between the second ends 180, 188. Furthermore, the shortest distance $D_1$ is greater than a diameter of the stud 112 so that the stud can be inserted into the first recess 124, but is less than a width W (FIG. 7B) of the washer 156 so that the washer can be trapped between the first and second retention walls 128, 130. And the shortest distance $D_2$ is greater than the width W. As illustrated in the figures, the shortest distance between the first and second retention walls 128, 130 gradually increases from their first ends 178, 186 to their second ends 180, 188. If the nut 114 is provided without the washer 156, the dimensional relationships set forth in this paragraph would hold true for the washer so that it can be trapped between the first and second retention walls 128, 130.

Figure 4A:
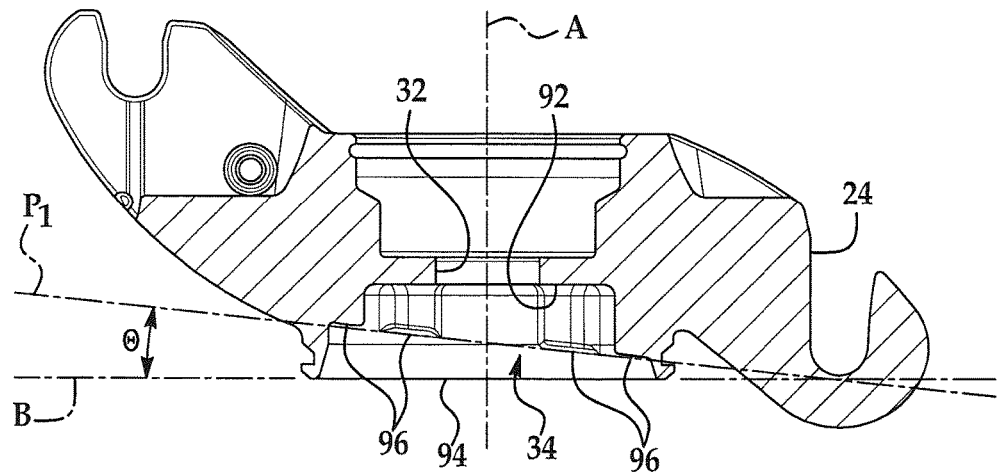
FIG. 4A is an enlarged cross-sectional view of the top mount of FIG. 1A.
Figure 5A:
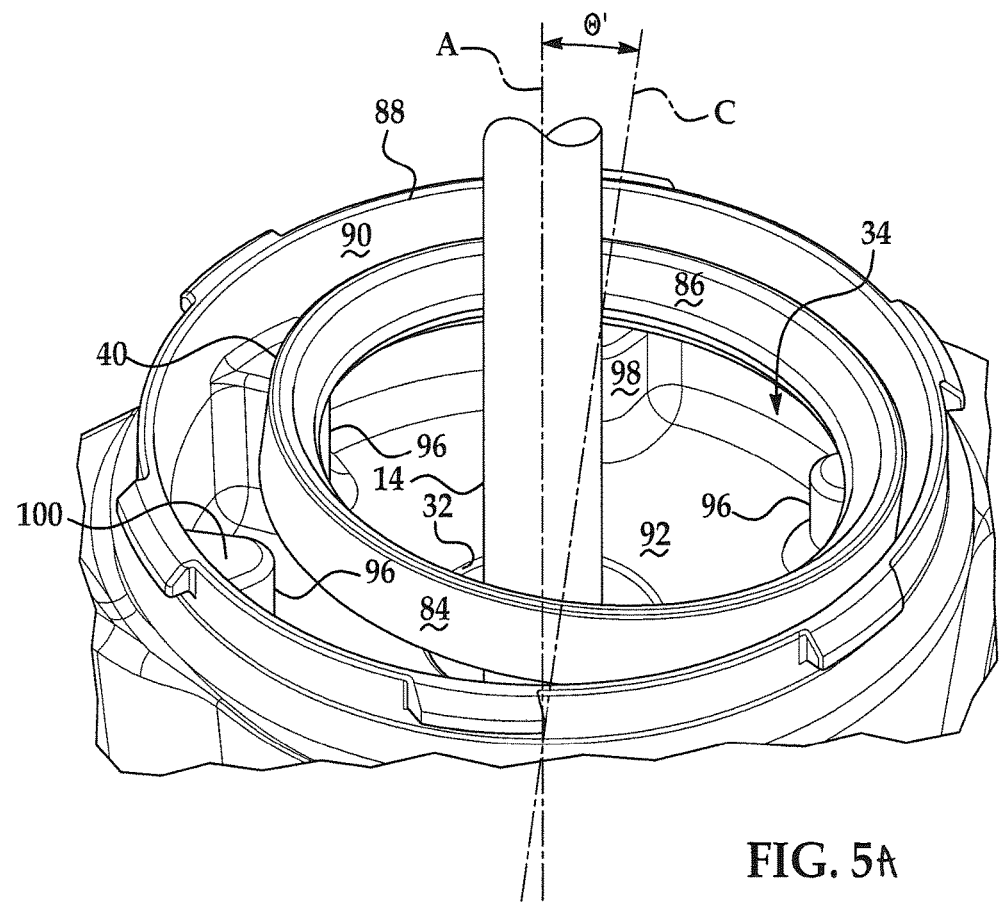
FIG. 5A is a bottom perspective view of a portion of the vehicle suspension system of FIG. 1A.
Figure 1B:
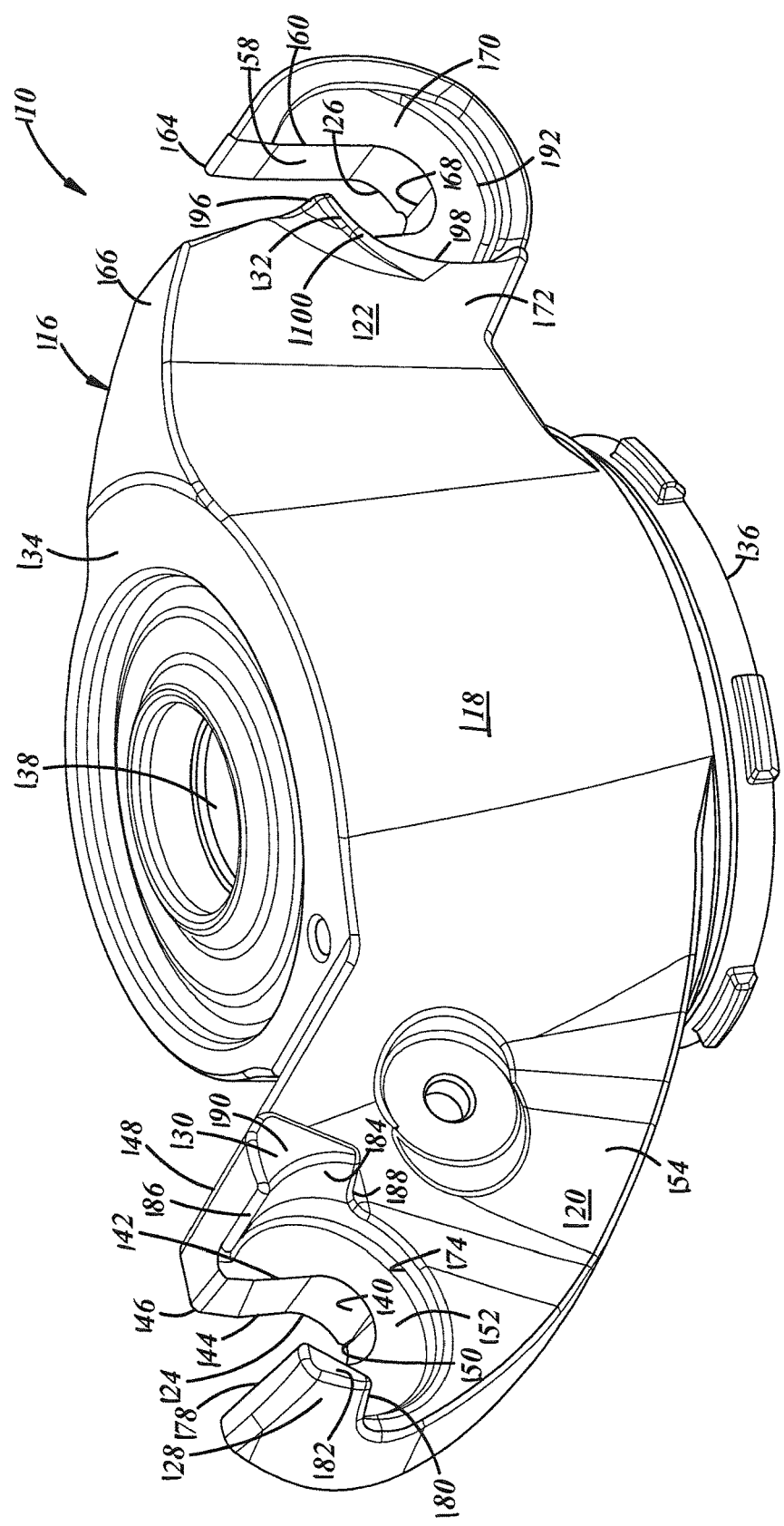
FIG. 1B is a front perspective view of an embodiment of an assembly mount.
Figure 2B:
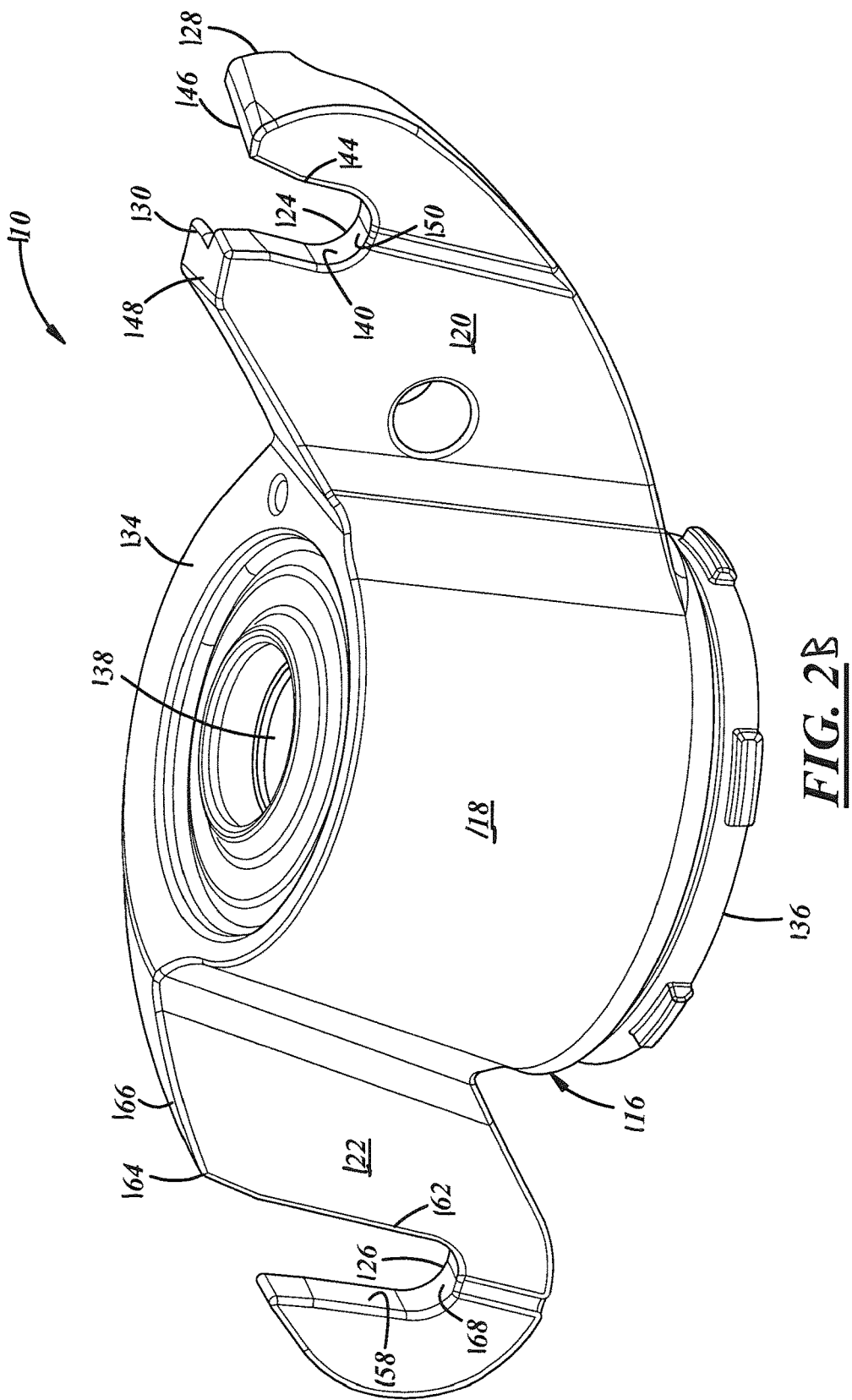
FIG. 2B is a rear perspective view of the assembly mount of FIG. 1B.
Figure 5B:
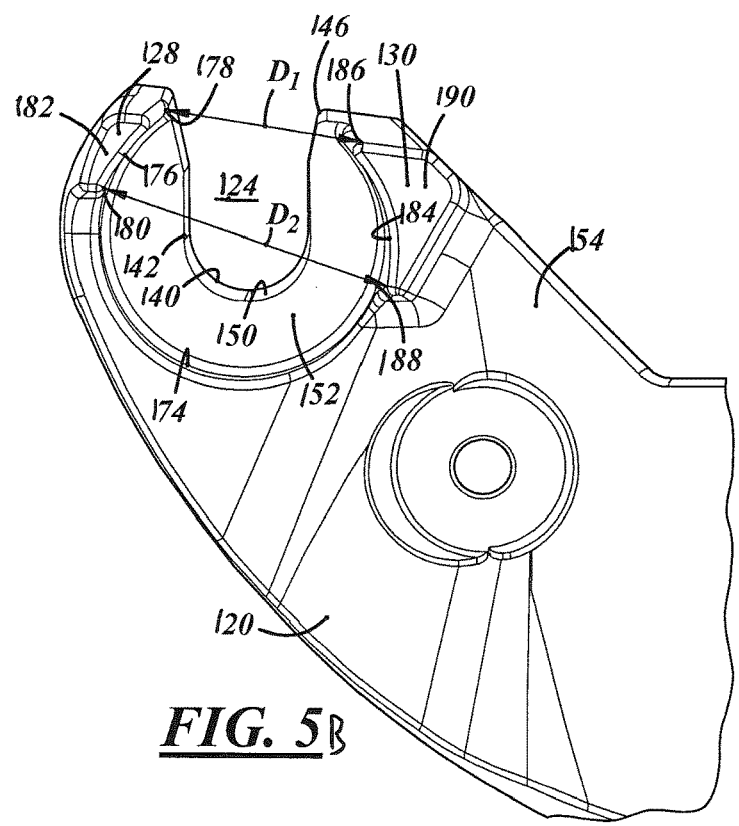
FIG. 5B is an enlarged view of an arm of the assembly mount of FIG. 1B.
Figure 6B:
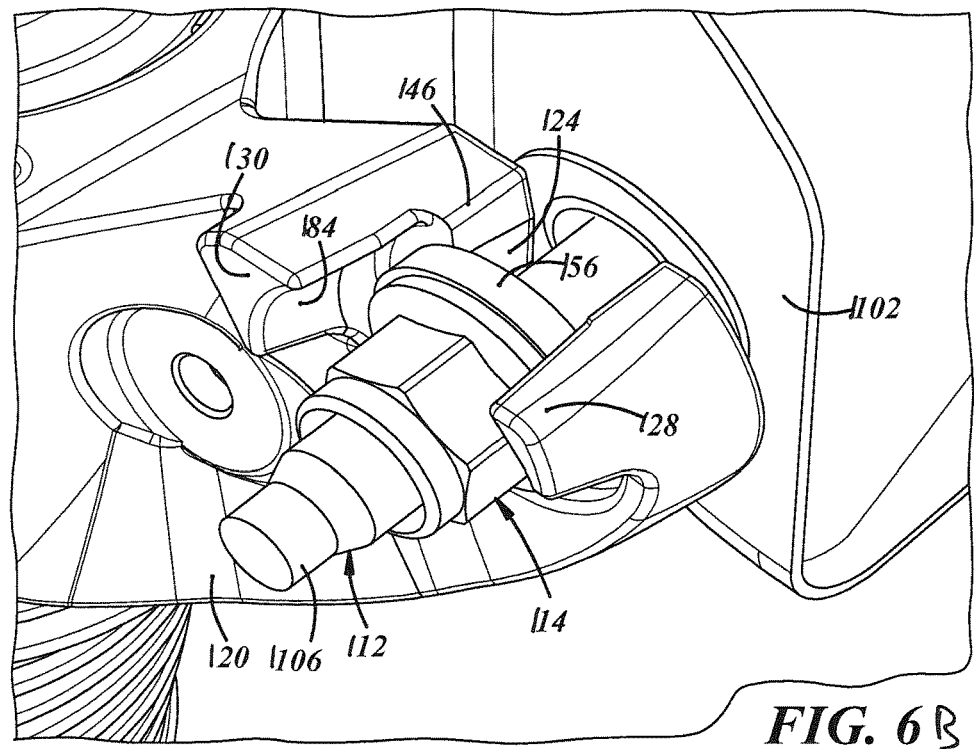
FIG. 6B is an enlarged view of the assembly mount of FIG. 1B in the midst of assembly with a stud.

In this embodiment there is only a single retention wall 132 at the second recess 126, unlike the two retention walls 128, 130 at the first recess 124. The side of the second recess 126 opposite the third retention wall 132 lacks a retention wall. Still, the second recess 126 could have two retention walls similar to those at the first recess 124, or need not have a retention wall at all. Referring now to FIGS. 1B, 3B, and 4B, the third retention wall 132 is a unitary extension of the second arm region and projects laterally from the front side 172 thereof. The back side of the second arm region 122 lacks a similarly constructed wall. The third retention wall 132 is situated near the first open side 160 of the second recess 126 and near the open end 164, and spans partly around the u-shape of the second recess 126. Like the first and second retention walls 128, 130, the third retention wall 132 is set back a distance from the transition between the recess wall 158 and seat surface 168, and begins to project laterally at a periphery 192 of the seat surface. The third retention wall 132 does not span completely around the periphery 192, but could in other embodiments.

The third retention wall 132 has a retention surface 194 generally confronting the second recess 126. The retention surface 194 spans between a first end 196 and a second end 198, and between a base of the third retention wall 132 to its terminal end 1100. In this embodiment the first end 196 is situated at the open end 164 of the second recess 126. Between the first and second ends 196, 198, the retention surface 194 has a curved surface contour to generally match a profile of the nut or the washer that is set thereat in installation.

As set forth above, the retention walls 128, 130, 132 temporarily join the top mount 110 and stud 112 together amid the assembly procedure before a more permanent joining is made. This is sometimes needed between the manual and final fastening steps. The assembly procedure can involve different steps depending on, among other factors, the particular vehicle application or other, non-vehicle application. In one example assembly procedure, a bottom end of the damper assembly may be initially joined to another vehicle component such as a suspension system component. After that, the top mount 110 can be brought vertically up toward the stud 112. Referring now to FIGS. 6B-8B, the stud 112 can be secured to a vehicle structure 1102 like a vehicle body, frame, or subframe, with a head 1104 of the stud at the vehicle structure and a stem 1106 projecting from the vehicle structure. The stud 112 could be a bolt, a screw, or some other fixing, depending on the particular application. If there are two recesses 124, 126 like depicted, there are typically two complementary studs 112, one for each recess. When the top mount 110 is being brought up toward the stud 112, the nut 114 and one or more washer(s) 156 can already be loosely fastened on the stud, though need not be. And depending on the particular application, the stud 112 could include only the nut 114, only the washer(s) 156, or, as illustrated, can include both.

Figure 7B:
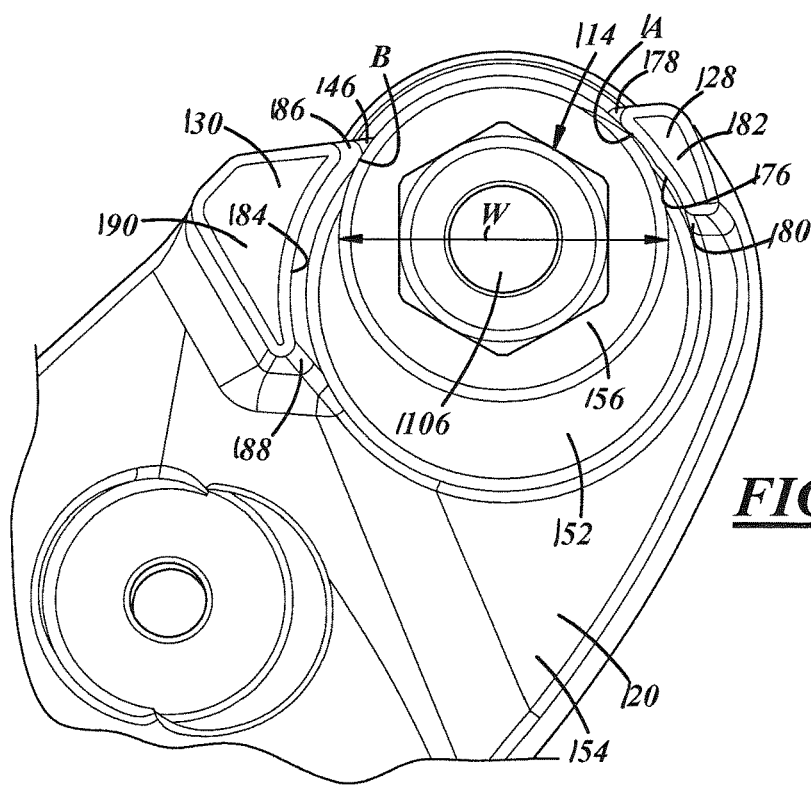
FIG. 7B is a top view of the assembly mount of FIG. 1B in the midst of assembly with a stud.

Since the recesses 124, 126 are open at the upper surfaces 148, 166, the recesses can receive insertion of the studs 112 as the top mount 110 is moved vertically upward to the studs. This omits the previously-practiced step of aligning the stud and hole together so that the stud's terminal end can be inserted first into the hole, as was the case with a hole closed around its sides and lacking an open end. At the first recess 124, the stem 1106 is received in the u-shape as the stem passes through the open end 146 and makes its way to the closed end 150. Here, the stem 1106 passes laterally through both the first and second open sides 142, 144, as perhaps best shown in FIG. 6B. The nut 114 and/or washer(s) 156 can now be manually fastened over the stem 1106 until coming into contact with the seat surface 152 and are laterally situated between the first and second retention walls 128, 130. The nut 114 and/or washer(s) 156 may have been pre-attached to the stem 1106. When manually fastened, but not yet finally fastened, the nut 114 and/or washer(s) 156 are trapped in between the first and second retention walls 128, 130, and hence the stem 1106 is maintained in the first recess 124. As illustrated in FIG. 7B, the first and second retention surfaces 176, 184 make surface-to-surface abutment with an outer circumferential surface of the washer 156 at interfaces A and B. In an example lacking the washer 156, the surface-to-surface abutment takes place between an outer surface of the nut 114 and the first and second retention surfaces 176, 184. The top mount 110 consequently keeps its place with the stud 112, despite only having been preliminarily joined together and despite the top mount hanging vertically downward via gravity.

If the second recess 126 is furnished with the third retention wall 132, the third retention wall similarly temporarily joins the top mount 110 to the stud at the second recess 126. Due to the shape of the top mount 110 and because the stud at the second recess 126 is located at a vertically lower position than the stud 112 at the first recess 124, the third retention wall 132 may sufficiently trap its stud within the second recess without a second retention wall.

Again here, the trapping occurs via surface-to-surface abutment between the retention surface 194 and an outer surface of the washer or of the nut.

Figure 8B:
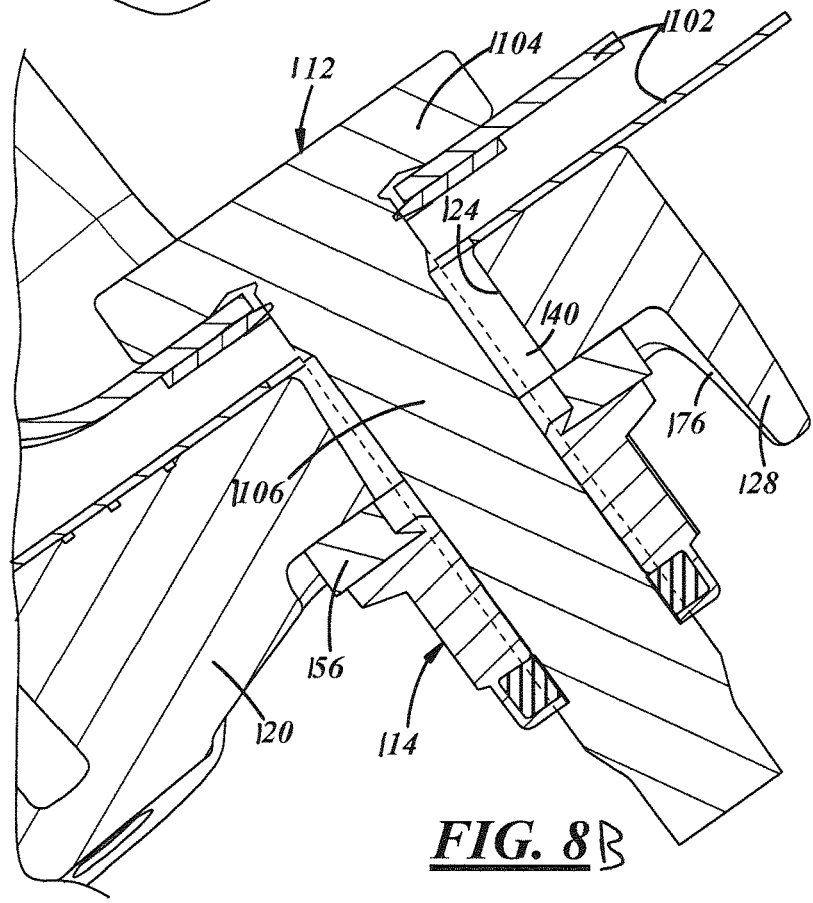
FIG. 8B is a sectional view of the assembly mount of FIG. 1B and of a stud.

While described thus far with surface-to-surface abutment being made between the nut 114 and/or washer 156 and retention surfaces 176, 184, it is possible that the stud 112 could be secured to the vehicle structure 1102 in an opposite arrangement than that depicted in FIG. 8B; in the opposite arrangement the head 1104 is the component that makes surface-to-surface abutment with the retention surfaces.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A spring aid assembly for a vehicle suspension system having a top mount and a damper, the spring aid assembly comprising:
   a spring aid having a proximal end, a distal end, a central passageway extending from the proximal end to the distal end to receive a rod of the damper, and a circumferential groove in an outer surface of the spring aid,
   the proximal end being configured to fit in a cavity of the top mount, the proximal end including a plurality of recesses that mate with projections provided in the cavity; and
   a ring positioned in the circumferential groove of the spring aid,
   wherein the ring indirectly rests on one or more of the projections when the spring aid is fully compressed such that the ring provides a travel stop to the vehicle suspension system that prevents a cap of the damper from coming into direct contact with the top mount during compression of the damper.

2. A spring aid assembly as claimed in claim 1, wherein the spring aid interacts with the top mount and with the cap during compression of the damper to decelerate axial movement of the damper.

3. A spring aid assembly as claimed in claim 1, wherein, during axial compression of the spring aid, the ring restricts radial expansion of the spring aid.

4. A spring aid assembly as claimed in claim 1, wherein the spring aid includes an inner tubular member and an outer sleeve coaxially positioned around a proximal end of the inner tubular member.

5. A spring aid assembly as claimed in claim 4, wherein the outer sleeve has a proximal end with an outer peripheral surface that includes the recesses and that is configured to form an interference fit with an inner peripheral surface of the inner peripheral wall of the top mount.

6. A spring aid assembly according to claim 1, the spring aid assembly comprising an assembly mount for use as a top mount, the assembly mount comprising:
   a body having a recess with a first open side, a second open side opposite said first open side, a closed end, and an open end, said body having at least one retention wall adjacent said first open side and adjacent said open end;
   wherein said recess receives a stud via said open end, the stud extending through said first and second open sides, said at least one retention wall retaining the stud in said recess via surface-to-surface abutment between said at least one retention wall and a nut, a washer, or a head of the stud before the stud is in a finally-fastened state.

7. A spring aid assembly as claimed in claim 1, wherein the ring has an inner diameter less than a width of the cap of the damper.

8. A vehicle suspension system, comprising:
   a top mount having an axial bore extending therethrough along a central axis and a generally cylindrical cavity formed in a bottom portion thereof, the cavity in the bottom portion of the top mount being bounded by an inner peripheral wall that has a plurality of axially and radially extending projections extending inwardly therefrom;
   a spring aid having a proximal end retained within the cavity of the top mount, a distal end extending in an axial direction away from the top mount, a central passageway extending from the proximal end to the distal end, and a circumferential groove in an outer surface of the spring aid;
   a ring positioned in the circumferential groove of the spring aid; and
   a damper including a housing and a rod extending out of the housing through a cap at one end of the housing, the rod of the damper extending through the passageway of the spring aid and being received in the bottom portion of the top mount and extending at least part way through the axial bore of the top mount;
   wherein the ring indirectly rests on one or more of the projections when the spring aid is fully compressed such that the ring provides a travel stop to the vehicle suspension system that prevents the cap from coming into direct contact with the top mount during compression of the damper.

9. A vehicle suspension system as claimed in claim 8, wherein the spring aid includes an inner tubular member and an outer sleeve coaxially positioned around a proximal end of the inner tubular member.

10. A vehicle suspension system as claimed in claim 9, wherein the outer sleeve has a proximal end with an outer peripheral surface that includes a plurality of recesses that are configured to mate with and form an interference fit with the projections of the top mount.

11. A vehicle suspension system as claimed in claim 8, wherein the axially and radially extending projections include oblique bottom surfaces that lie in substantially the same plane as one another and form an acute angle with respect to a transverse axis of the top mount.

12. A vehicle suspension system as claimed in claim 11, wherein during full compression of the damper a central longitudinal axis of the rod of the damper is substantially perpendicular to the plane defined by the oblique bottom surfaces.

13. A vehicle suspension system as claimed in claim 11, wherein during full compression of the damper the top and bottom surfaces of the ring are substantially parallel to the plane defined by the oblique bottom surfaces.

14. A vehicle suspension system as claimed in claim 8, wherein the ring has substantially parallel top and bottom surfaces that each define a plane, and, during full compression of the damper, the top surface of the ring indirectly rests via the spring aid against one or more of the projections, and the cap of the damper indirectly rests via the spring aid against the bottom surface of the ring such that travel of the rod in the axial direction is stopped.

15. A vehicle suspension system as claimed in claim 14, wherein when the damper is in a substantially uncompressed state the top and bottom surfaces of the ring are generally perpendicular to the central axis of the top mount.

16. A vehicle suspension system as claimed in claim 8, wherein one or more of:
- the axially and radially extending projections are spaced apart from one another along the inner peripheral wall of the housing;
- the axially and radially extending projections are unitary portions of the top mount; and
- the top mount includes a pair of arm regions that are configured to couple the top mount to a component of a vehicle body.

17. A vehicle including a vehicle suspension system as claimed in claim 8.

18. A top mount for a vehicle suspension system, the top mount having:
- an axial bore extending therethrough along a central axis, and
- a generally cylindrical cavity formed in a bottom portion thereof to receive a proximal end of a spring aid assembly,
- the cavity in the bottom portion of the top mount being bounded by an inner peripheral wall that has a plurality of axially and radially extending projections extending inwardly therefrom, and
- wherein the axially and radially extending projections include oblique bottom surfaces that lie in substantially the same plane as one another and form an acute angle with respect to a transverse axis of the top mount.

19. A top mount as claimed in claim 18 wherein the cavity has an annular top wall and the projections extend in an axial direction from the top wall.

20. A top mount as claimed in claim 18, wherein one or more of:
- the axially and radially extending projections are spaced apart from one another along the inner peripheral wall of the housing;
- the axially and radially extending projections are unitary portions of the top mount; and
- the top mount includes a pair of arm regions that are configured to couple the top mount to a component of a vehicle body.

\* \* \* \* \*